(12) United States Patent
Yamanaka et al.

(10) Patent No.: US 7,926,472 B2
(45) Date of Patent: Apr. 19, 2011

(54) INLET SYSTEM

(75) Inventors: Tetsuji Yamanaka, Obu (JP); Hironori Kitadani, Nishikamo-gun (JP)

(73) Assignees: Denso Corporation, Kariya (JP); Toyota Jidosha Kabushiki Kaisha, Toyota (JP)

(*) Notice: Subject to any disclaimer, the term of this patent is extended or adjusted under 35 U.S.C. 154(b) by 442 days.

(21) Appl. No.: 12/121,048

(22) Filed: May 15, 2008

(65) Prior Publication Data

US 2008/0295813 A1    Dec. 4, 2008

(30) Foreign Application Priority Data

May 29, 2007  (JP) ................. 2007-142062

(51) Int. Cl.
*F02M 25/07*       (2006.01)
(52) U.S. Cl. ................................ 123/568.17
(58) Field of Classification Search ............ 123/568.17
See application file for complete search history.

(56) References Cited

U.S. PATENT DOCUMENTS

| | | | | |
|---|---|---|---|---|
| 4,741,295 A | * | 5/1988 | Hosoya et al. | 123/568.17 |
| 5,201,549 A | * | 4/1993 | Davey | 285/39 |
| 5,433,183 A | * | 7/1995 | Vansnick | 123/568.11 |
| 5,492,104 A | * | 2/1996 | Elder et al. | 123/568.17 |
| 5,542,711 A | * | 8/1996 | Vaudry | 123/568.17 |
| RE36,630 E | * | 3/2000 | Davey | 285/39 |
| 6,173,701 B1 | * | 1/2001 | Azuma | 123/568.17 |
| 6,293,265 B1 | * | 9/2001 | Gagnon | 123/568.17 |
| 6,443,134 B1 | * | 9/2002 | Von Werder et al. | 123/568.17 |
| 6,672,292 B2 | * | 1/2004 | Fischer | 123/568.17 |
| 6,698,407 B2 | * | 3/2004 | Ikegawa | 123/568.17 |
| 6,874,487 B2 | * | 4/2005 | Murphy | 123/568.17 |
| 2002/0112708 A1 | | 8/2002 | Fischer et al. | |

FOREIGN PATENT DOCUMENTS

| | | |
|---|---|---|
| JP | 05-044583 | 2/1993 |
| JP | 06-101587 | 4/1994 |
| JP | 07-189643 | 7/1995 |
| JP | 2000-018108 | 1/2000 |
| JP | 2000-161161 | 6/2000 |
| JP | 2005054734 A * | 3/2005 |

OTHER PUBLICATIONS

Japanese Office Action dated Apr. 21, 2009, issued in corresponding Japanese Application No. 2007-142062, with English translation.

* cited by examiner

*Primary Examiner* — Stephen K Cronin
*Assistant Examiner* — Arnold Castro
(74) *Attorney, Agent, or Firm* — Nixon & Vanderhye PC

(57) ABSTRACT

An inlet system includes an intake manifold and an EGR inlet projecting into and received in the manifold through an insertion portion of the manifold. A leading end of the inlet is inserted into the manifold through the insertion portion, projecting to reach a target position. An insertion portion opening diameter, which is an opening diameter of one side of the insertion portion, is larger than an insertion maximum occupying diameter that is a maximum distance between a point included in a cutting surface of the inlet on a reference plane perpendicular to an insertion portion axis and a point included in a vertical projection view of the leading end. A distance between the plane and a nearest point of the leading end to the plane in an axial direction is equal to an insertion portion opening depth, which is a length of the insertion portion in the axial direction.

4 Claims, 3 Drawing Sheets

United States Patent US 7,926,472 B2

INLET SYSTEM

CROSS REFERENCE TO RELATED APPLICATION

This application is based on and incorporates herein by reference Japanese Patent Application No. 2007-142062 filed on May 29, 2007.

BACKGROUND OF THE INVENTION

1. Field of the Invention

The present invention relates to an inlet system which supplies intake air to an engine.

2. Description of Related Art

Conventionally, in an inlet system, a part of exhaust gas from an internal combustion engine is mixed with fresh air to be suctioned into a cylinder, in order to reduce nitrogen oxide in exhaust gas or to improve fuel mileage at the time of partial loading. (The exhaust gas mixed with fresh air in the inlet system is hereinafter referred to as EGR (exhaust gas recirculation) gas).

EGR gas blows off into the inside of an intake manifold, and is mixed with fresh air in the intake manifold to be suctioned into each cylinder. Accordingly, it is necessary to arrange the gas outlet of EGR gas at a predetermined target position in order that EGR gas may be suctioned evenly into each cylinder (see e.g., JP7-189643A).

However, in order to arrange the gas outlet (leading end of an EGR inlet) of EGR gas at the target position, it is necessary to make a leading end of the EGR inlet project to the target position, changing a position of the EGR inlet in various manners. Accordingly, the EGR inlet is extremely troublesomely attached to the intake manifold, which is one of factors in cost rising of the inlet system.

In order to improve the workability in attaching the EGR inlet, the complicatedness of changing the position of the EGR inlet in attaching the EGR inlet may be mitigated by expanding an opening diameter of an insertion portion into the inside of the intake manifold. However, since rigidity of the intake manifold becomes lower as the opening diameter of the insertion portion becomes larger, the method of simply enlarging the opening diameter is not desirable.

SUMMARY OF THE INVENTION

The present invention addresses the above disadvantages. Thus, it is an objective of the present invention to improve workability in attaching an EGR inlet to an intake manifold, in an inlet system in which EGR gas is mixed with fresh air and then supplied to a cylinder.

To achieve the objective of the present invention, there is provided an inlet system including an intake manifold and an EGR inlet. The intake manifold is connected to a cylinder head of an engine for distributing intake air by turns among cylinders. The EGR inlet projects into an inside of the intake manifold. EGR gas flows to the inside of the intake manifold through the EGR inlet. The intake manifold has an insertion portion, which is formed in a generally cylindrical shape, and through which the EGR inlet is received in the inside of the intake manifold. One side of the insertion portion in an axial direction of the insertion portion opens to an outside of the intake manifold, and the other side of the insertion portion in the axial direction opens into the inside of the intake manifold. A leading end portion of the EGR inlet is inserted into the inside of the intake manifold through the insertion portion, thereby projecting to reach a predetermined target position, so that EGR gas flows out of the leading end portion to the inside of the intake manifold. An insertion portion opening diameter is larger than an insertion maximum occupying diameter, provided that: the insertion portion opening diameter is a diameter of an opening of the one side of the insertion portion; an insertion portion opening depth is a length of the insertion portion in the axial direction between the opening of the one side of the insertion portion and a farthest circumferential position of the insertion portion from the opening of the one side, the farthest circumferential position intersecting with a direction from an axis of the insertion portion toward the predetermined target position; and the insertion maximum occupying diameter is a maximum distance between a point included in a cutting surface of the EGR inlet on an imaginary reference plane that is perpendicular to the axis of the insertion portion, and a point included in a vertical projection view of the leading end portion of the EGR inlet that is a part of the imaginary reference plane, onto which the leading end portion of the EGR inlet is vertically projected. A distance between the imaginary reference plane and a nearest point of the leading end portion of the EGR inlet to the imaginary reference plane in the axial direction is equal to the insertion portion opening depth.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Figure 1:
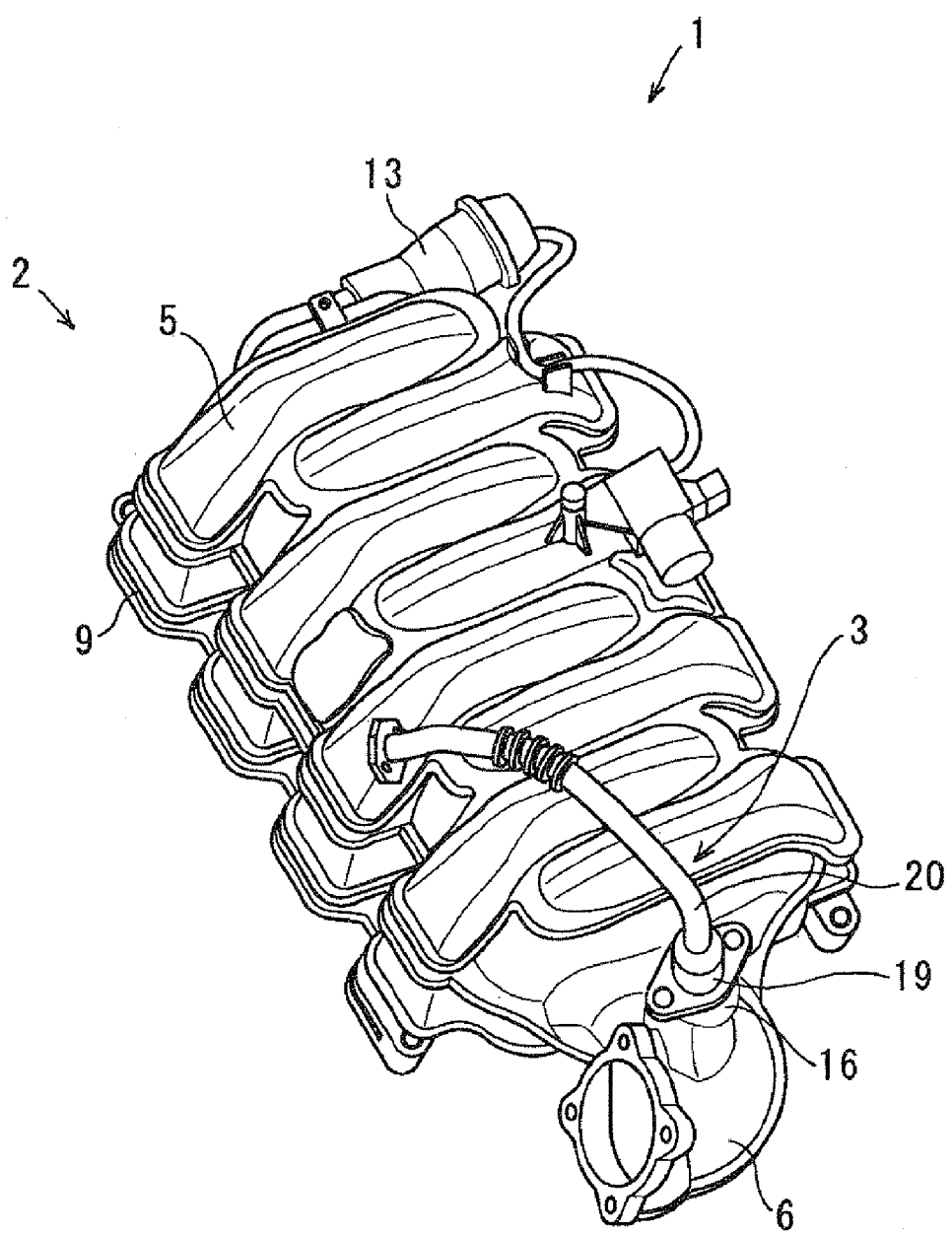
FIGS. 1 is a perspective view illustrating an inlet system according to an embodiment of the invention.

An inlet system according to an embodiment of the invention includes an intake manifold, which is connected to a cylinder head of an engine and distributes intake air to cylinders by turns, and an EGR inlet, which projects into an inside of the intake manifold, and through which EGR gas blows off into the inside of the intake manifold. The intake manifold has an insertion portion, in which the EGR inlet is received. The insertion portion is formed in an approximately cylindrical shape. An upper side portion of the insertion portion opens to the outside of the intake manifold, and a lower side portion of the insertion portion opens in the inside of the intake manifold. A leading end of the EGR inlet is inserted into the inside of the intake manifold through the insertion portion so as to project to a predetermined target position. Accordingly, the leading end serves as a gas outlet, through which EGR gas blows off into the inside of the intake manifold.

An opening diameter of an upper portion of the insertion portion is defined as an insertion portion opening diameter A. A length of the insertion portion in its axial direction at a circumferential position of the insertion portion is defined as an insertion portion opening depth B. The circumferential position of the insertion portion crosses a direction from a shaft center of the insertion portion parallel to an upper-lower direction toward the target position. When a reference plane perpendicular to the shaft center of the insertion portion is assumed at a position which is located the insertion portion opening depth B above the topmost part of the leading end of the EGR inlet in the axial direction, and a maximum distance between a point included in a cutting plane of the EGR inlet on the reference plane and a point included in a vertical projection view of the leading end of the EGR inlet onto the reference plane is defined as an insertion maximum occupying diameter C, the insertion portion opening diameter A is larger than the insertion maximum occupying diameter C.

According to the above inlet system, the leading end portion of the EGR inlet is formed in a linear shape toward its forefront. The intake manifold includes a plurality of delivery tubes and an introducing pipe. The plurality of delivery tubes is arranged side by side in a row in a direction from one end toward the other end. An upstream end of the delivery tube opens in a surge tank, and a downstream end of the delivery tube is connected to a cylinder head. Accordingly, the plurality of delivery tubes conducts intake air out into the corresponding cylinders from the surge tank. The introducing pipe is connected to one end side or the other end side of the surge tank to conduct intake air into the surge tank. The leading end of the EGR inlet is disposed at the target position, which is a connection of the introducing pipe to the surge tank.

According to the above inlet system, the EGR inlet is disposed coaxially with the insertion portion from an upper opening position of the insertion portion to a predetermined depth position inside the intake manifold. Also, the EGR inlet is inclined in a direction of the target position below the predetermined depth position. The intake manifold is formed from resin, and the EGR inlet has an outer circumference pipe on an outer circumferential side of its main pipe. The outer circumference pipe is connected to the insertion portion, and its diameter is reduced above the insertion portion, where the outer circumference pipe is joined to the main pipe.

Configuration of the Embodiment

A configuration of an inlet system 1 of the embodiment is explained below with reference to FIGS. 1 to 3. The inlet system I supplies intake air to an engine (not shown), and is attached to, for example, a V-eight engine in which eight cylinders (not shown) adjacent to each other in an axial direction are distributed alternately right and left. In the inlet system 1, a part of exhaust gas is conducted into an intake manifold 2 to be mixed with fresh air, and the mixture is suctioned into a cylinder in order to reduce nitrogen oxides contained in exhaust gas from the engine and to improve fuel mileage in partial loading (In an intake manifold 2, the exhaust gas mixed with fresh air is hereinafter referred to as EGR gas).

The inlet system 1 includes the intake manifold 2, which is connected to a cylinder head (not shown) of the engine and distributes intake air to the cylinders by turns, and an EGR inlet 3, which serves as a blow-off pipe of EGR gas into the inside of the intake manifold 2 and projects into the inside of the intake manifold 2. EGR gas is taken out from an exhaust manifold (not shown) of the engine or an exhaust port of the cylinder head. Then, a flow of EGR gas is controlled through a predetermined valve device (EGR valve device: not shown) to be conducted into the EGR inlet 3, and blows off into the intake manifold 2.

The intake manifold 2 includes a plurality of delivery tubes 5, which conduct intake air out into the cylinder from a surge tank 4, and an introducing pipe 6, which conducts fresh air into the surge tank 4. The delivery tubes 5 are formed side by side in a row in a direction from one end toward the other end. An upstream end of the delivery tube 5 opens in the surge tank 4, and a downstream end of the delivery tube 5 is connected to the cylinder head. The introducing pipe 6 is connected to one end side of the surge tank 4.

Figure 2:
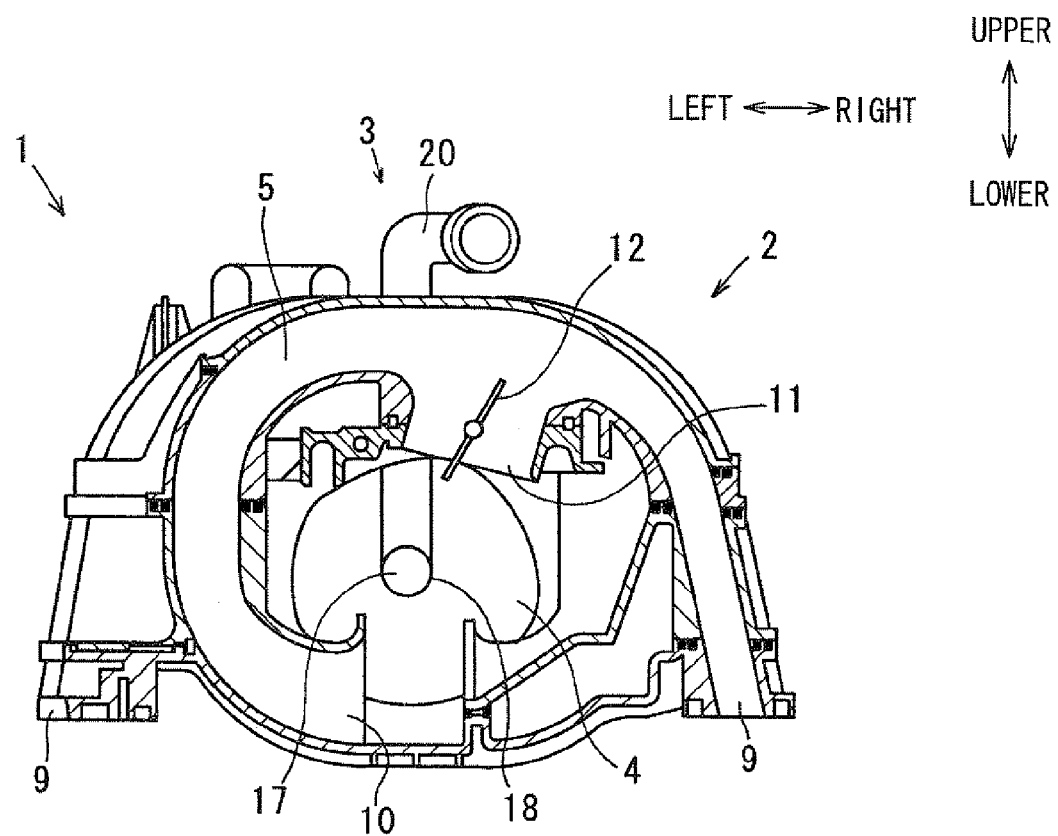
FIG. 2 is a cross-sectional view illustrating an inside of the inlet system.

As shown in FIG. 2, the delivery tubes 5 are formed along an outer circumference of the intake manifold 2. The downstream ends of the delivery tubes 5, which serve as connecting ends 9 to the cylinder head, are allocated alternately right and left. Two upstream ends of the delivery tube 5 open in the surge tank 4. One upstream end (hereinafter referred to as an open end 10) of the delivery tube 5 opens at a lower part of the surge tank 4, and the other upstream end (hereinafter referred to as an open end 11) of the delivery tube 5 opens at an upper part of the surge tank 4. The respective open ends 10, 11 of the delivery tubes 5 are also allocated alternately right and left. An upstream end of the introducing pipe 6 is connected to a throttle body (not shown).

The intake manifold 2 supplies intake air according to an operating condition of the engine, and thus includes valve bodies 12 in the all corresponding open ends 11. When the open end 11 is closed by the valve body 12, intake air in the surge tank 4 is suctioned into the delivery tube 5 only through the open end 10 to be supplied to the cylinder. When the open end 11 is opened, the intake air in the surge tank 4 is suctioned into the delivery tube 5 mainly through the open end 11 to be supplied to the cylinder. In other words, when the open end 11 is opened, the intake air greatly bypasses the delivery tube 5 to be supplied to the cylinder. The valve body 12 is rotated using driving force obtained from a negative pressure actuator 13 which operates with a negative pressure produced by intake air as its driving source.

The introducing pipe 6 of the intake manifold 2 has an insertion portion 16 for conducting the EGR inlet 3 into the intake manifold 2. The insertion portion 16 is formed in an approximately cylindrical shape with its upper side portion opening to the outside of the intake manifold 2 and its lower side portion opening to the inside of the intake manifold 2. The main body of the intake manifold 2 including the delivery tube 5, the introducing pipe 6, and the insertion portion 16 is formed from, for example, resins such as polyamide.

A leading end of the EGR inlet 3 is inserted into the intake manifold 2 through the insertion portion 16, thereby projecting to a predetermined target position so as to serve as a gas outlet 17 through which EGR gas blows off to the inside of the intake manifold 2. The target position where the leading end of the EGR inlet 3 is disposed is located at a connection between the surge tank 4 and the introducing pipe 6, and the gas outlet 17 opens, facing the surge tank 4 Toward its leading end, the end portion of the EGR inlet 3 serves as a linear straight part 18.

Figure 3:
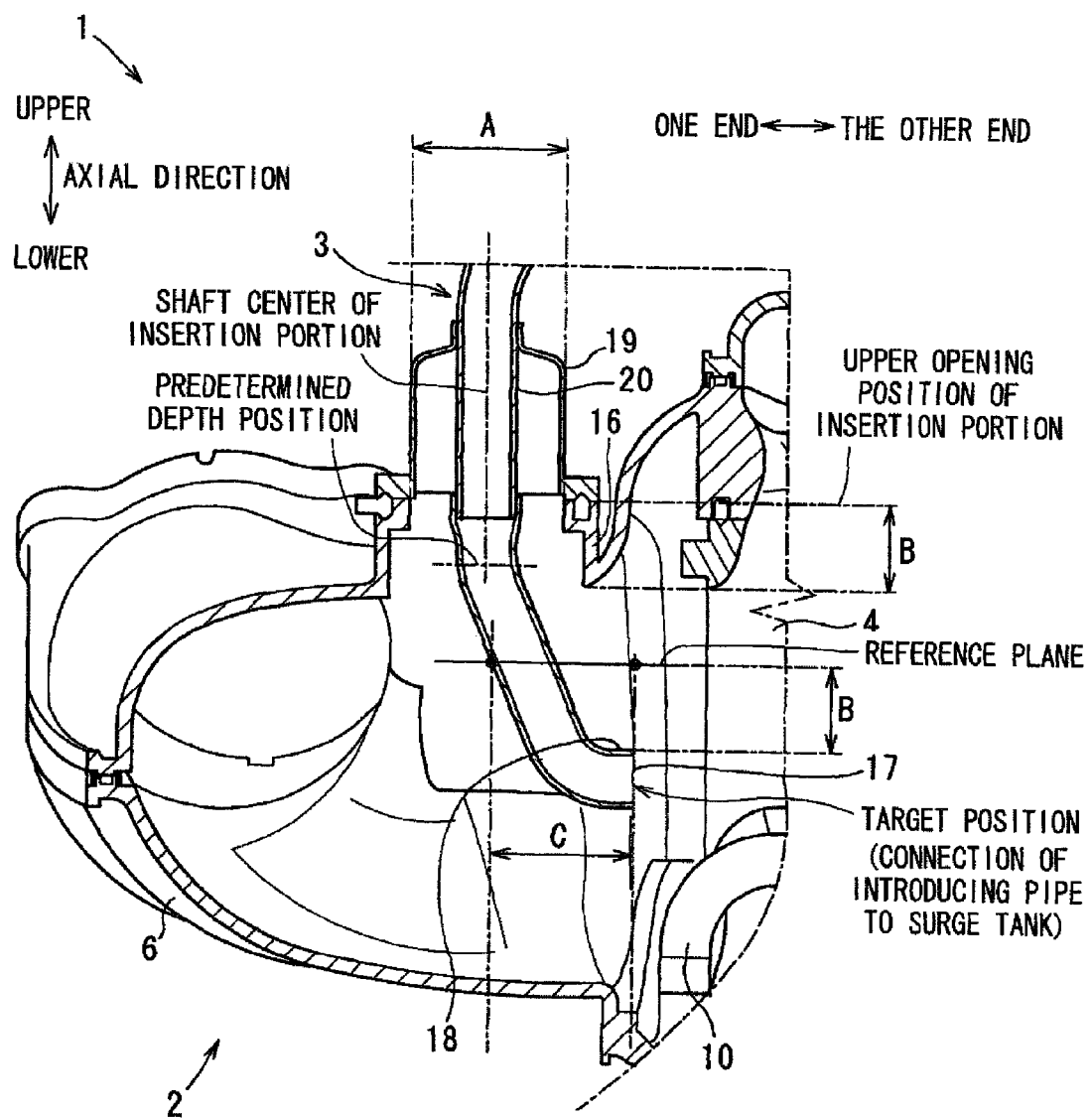
FIG. 3 is a partial cross sectional view illustrating an important section of the inlet system.

As shown in FIG. 3, an opening diameter of a upper portion of the insertion portion 16 is defined as an insertion portion opening diameter A. A length of the insertion portion 16 in its axial direction at a circumferential position of the insertion portion 16 is defined as an insertion portion opening depth B. The circumferential position of the insertion portion 16 crosses a direction from a shaft center of the insertion portion 16 parallel to an upper-lower direction toward the target position (FIG. 3 is an internal cross-sectional view of the intake manifold 3 passing through the cross section including the above circumferential position of the insertion portion 16 and the shaft center of the insertion portion 16).

The EGR inlet 3 is formed in the insertion portion 16 coaxially with the insertion portion 16 from an upper opening position of the insertion portion 16 to a predetermined depth position. Then, the EGR inlet 3 is inclined in a direction of the target position below the predetermined depth position to be connected to the straight part 18. The EGR inlet 3 has an outer circumference pipe 19 connected to the insertion portion 16. The outer circumference pipe 19 is arranged on an outer circumferential side of a main pipe 20, in which EGR gas flows. A diameter of the outer circumference pipe 19 is reduced above the insertion portion 16 in order that the outer circumference pipe 19 is joined on the main pipe 20.

When a reference plane perpendicular to the shaft center of the insertion portion 16 is assumed at a position which is located the insertion portion opening depth B above the topmost part of the leading end of the EGR inlet 3 in the axial direction, and a maximum distance between a point included in a cutting plane of the EGR inlet 3 on the reference plane and a point included in a vertical projection view of the leading end of the EGR inlet 3 onto the reference plane is defined as an insertion maximum occupying diameter C, the insertion portion opening diameter A is larger than the insertion maximum occupying diameter C.

Advantageous Effects of the Embodiment

According to the inlet system 1 of the embodiment 1, the insertion portion 16, through which the EGR inlet 3 is inserted into the intake manifold 2, is formed in an approximately cylindrical shape. The leading end of the EGR inlet 3 projects to the predetermined target position inside the intake manifold 2. A reference plane perpendicular to the shaft center of the insertion portion 16 is assumed at the position, which is located the insertion portion opening depth B above the uppermost part of the leading end of the EGR inlet 3 in the axial direction. When the maximal value of the distance between the point included in the cutting plane of the EGR inlet 3 on the reference plane and the point included in the vertical projection view of the leading end of the EGR inlet 3 onto the reference plane is defined as the insertion maximum occupying diameter C, the insertion portion opening diameter A is larger than the insertion maximum occupying diameter C.

Accordingly, when the EGR inlet 3 is positioned in the circumferential direction, the leading end of the EGR inlet 3 can be made to project to the target position by moving the EGR inlet 3 linearly in the radial direction and in the axial direction (all of the axial direction, the circumferential direction, and the radial direction are the directions with respect to the insertion portion 16). As a result, since it is unnecessary to change the position of the EGR inlet 3 in various manners to make the leading end of the EGR inlet 3 project to the target position, workability in attaching the EGR inlet 3 to the intake manifold 2 is improved. The insertion portion opening diameter A is freely set in a range in which it is larger than the insertion maximum occupying diameter C. Consequently, the insertion portion opening diameter A is minimized so that rigidity of the intake manifold 2 may be in a permissible range.

Toward its leading end, the end portion of the EGR inlet 3 serves as a linear straight part 18. As a result, a direction in which EGR gas blows off from the EGR inlet 3 is stabilized.

In the intake manifold 2, the delivery tubes 5 of intake air from the surge tank 4 into the corresponding cylinders are arranged side by side in a row in the direction from one end toward the other end. The introducing pipe 6 of fresh air into the surge tank 4 is connected to one end side of a surge tank 4. The target position where the leading end of the EGR inlet 3 is located is the connection of the introducing pipe 6 to the surge tank 4. Accordingly, EGR gas is evenly suctioned into each cylinder.

The EGR inlet 3 is formed in the insertion portion 16 coaxially with the insertion portion 16 from an upper opening position of the insertion portion 16 to a predetermined depth position. Then, the EGR inlet 3 is inclined in a direction of the target position below the predetermined depth position to be connected to the straight part 18. When making the leading end of the EGR inlet 3 project to the target position, the EGR inlet 3 is simultaneously moved in the both directions of the axial direction and the radial direction. Thus, the leading end of the EGR inlet 3 is even more simply made to project to the target position.

Because a weight saving and decrease in intake-air temperature are recently promoted, many intake manifolds are formed from resin such as polyamide 6. On the other hand, EGR gas which passes through the main pipe 20 of the EGR inlet 3 has a high temperature of a little more than 200° C. Accordingly, when the main pipe 20 is directly connected to an insertion portion of an intake manifold made of resin, the insertion portion is heated to the temperature near a melting point of the resin by heat transfer from EGR gas flowing through the main pipe 20. For this reason, problems such as melting and high-temperature degradation of resin are created in the intake manifold.

The EGR inlet 3 has the outer circumference pipe 19 connected to the insertion portion 16. In a position above the insertion portion 16, the diameter of the outer circumference pipe 19 is reduced and thereby the outer circumference pipe 19 is joined to the main pipe 20. As a result, the heat of the EGR gas flowing through the main pipe 20 to the insertion portion 16 is transmitted via the main pipe 20 and the outer circumference pipe 19. Thus, the heat transfer of the EGR gas flowing through the main pipe 20 to the insertion portion 16 is eased compared with the case in which the main pipe 20 is directly connected to the insertion portion 16.

In addition, the insertion portion 16 and the outer circumference pipe 19 are cooled from their both sides by intake air on the inner circumferential side of the outer circumference pipe 19 and outside air on the outer circumferential side of the outer circumference pipe 19. Accordingly, even though the intake manifold 2 is made of resin, melting or high-temperature degradation of resin by the heat transmitted from EGR gas is avoided.

Modifications

The inlet system 1 of the embodiment supplies intake air to the V-type engine. Alternatively, the inlet system 1 may also be employable for an inline engine or a horizontal opposed engine. The EGR inlet 3 of the embodiment includes a part (coaxial part) that is formed in the insertion portion 16 coaxially with the insertion portion 16 and a part (inclined part) that is inclined in the direction of the target position, which are connected together. Alternatively, the coaxial part and the inclined part may be connected together below the insertion portion 16.

Additional advantages and modifications will readily occur to those skilled in the art. The invention in its broader terms is therefore not limited to the specific details, representative apparatus, and illustrative examples shown and described.

What is claimed is:
1. An inlet system comprising:
an intake manifold connected to a cylinder head of an engine for distributing intake air by turns among cylinders; and
an EGR inlet, which projects into an inside of the intake manifold, and through which EGR gas flows to the inside of the intake manifold, wherein:
the intake manifold has an insertion portion, which is formed in a generally cylindrical shape, and through which the EGR inlet is received in the inside of the intake manifold;

one side of the insertion portion in an axial direction of the insertion portion opens to an outside of the intake manifold, and the other side of the insertion portion in the axial direction opens into the inside of the intake manifold;
a leading end portion of the EGR inlet is inserted into the inside of the intake manifold through the insertion portion, thereby projecting to reach a predetermined target position, so that EGR gas flows out of the leading end portion to the inside of the intake manifold; and
an insertion portion opening diameter is larger than an insertion maximum occupying diameter, provided that:
the insertion portion opening diameter is a diameter of an opening of the one side of the insertion portion;
an insertion portion opening depth is a length of the insertion portion in the axial direction between the opening of the one side of the insertion portion and a farthest circumferential position of the insertion portion from the opening of the one side, the farthest circumferential position intersecting with a direction from an axis of the insertion portion toward the predetermined target position; and
the insertion maximum occupying diameter is a maximum distance between:
a point included in a cutting surface of the EGR inlet on an imaginary reference plane that is perpendicular to the axis of the insertion portion, wherein a distance between the imaginary reference plane and a nearest point of the leading end portion of the EGR inlet to the imaginary reference plane in the axial direction is equal to the insertion portion opening depth; and
a point included in a vertical projection view of the leading end portion of the EGR inlet that is a part of the imaginary reference plane, onto which the leading end portion of the EGR inlet is vertically projected; and
the intake manifold further includes:
a plurality of delivery tubes aligned in a direction from one end toward the other end of the intake manifold, wherein an upstream end of each of the plurality of delivery tubes opens into a surge tank of the engine, and a downstream end of each of the plurality of delivery tubes is connected to the cylinder head, so that the plurality of delivery tubes conducts intake air from the surge tank into the corresponding cylinders; and
an introducing pipe connected to one of one end side and the other end side of the surge tank thereby to conduct intake air into the surge tank, wherein the leading end portion of the EGR inlet is disposed at the predetermined target position, where the introducing pipe is connected to the surge tank.

2. The inlet system according to claim 1, wherein an EGR gas outlet portion of the EGR inlet is formed in a linear straight shape.

3. The inlet system according to claim 1, wherein:
a first portion of the EGR inlet ranging from the opening of the one side of the insertion portion to a predetermined depth position inside the intake manifold is formed coaxially with the insertion portion; and
a second portion of the EGR inlet on an opposite side across the predetermined depth position from the first portion is inclined toward the predetermined target position.

4. The inlet system according to claim 1, wherein:
the intake manifold is formed from resin;
the EGR inlet includes a main pipe and an outer circumference pipe, which is disposed on an outer circumferential side of the main pipe;
the outer circumference pipe is connected to the insertion portion; and
a diameter of the outer circumference pipe is reduced at a certain position which is a predetermined distance away from the opening of the one side of the insertion portion in the axial direction from the other side toward the one side of the insertion portion, so that the outer circumference pipe is joined to the main pipe at the certain position.

* * * * *